(12) United States Patent
Das et al.

(10) Patent No.: US 11,769,495 B2
(45) Date of Patent: Sep. 26, 2023

(54) CONVERSATIONAL AI PLATFORMS WITH CLOSED DOMAIN AND OPEN DOMAIN DIALOG INTEGRATION

(71) Applicant: NVIDIA Corporation, Santa Clara, CA (US)

(72) Inventors: Shubhadeep Das, Maharashtra (IN); Sumit Bhattacharya, Maharashtra (IN); Ratin Kumar, Cupertino, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 18/067,217

(22) Filed: Dec. 16, 2022

(65) Prior Publication Data

US 2023/0120989 A1    Apr. 20, 2023

Related U.S. Application Data

(63) Continuation of application No. 17/218,751, filed on Mar. 31, 2021, now Pat. No. 11,568,861.

(51) Int. Cl.
*G10L 15/22*  (2006.01)
*G10L 15/18*  (2013.01)
*G10L 13/02*  (2013.01)
*G10L 15/30*  (2013.01)

(52) U.S. Cl.
CPC .......... *G10L 15/1815* (2013.01); *G10L 13/02* (2013.01); *G10L 15/22* (2013.01); *G10L 15/30* (2013.01)

(58) Field of Classification Search
CPC ...... G10L 15/1815; G10L 15/22; G10L 15/30
See application file for complete search history.

(56) References Cited

U.S. PATENT DOCUMENTS

| 11,568,861 | B2 | 1/2023 | Das et al. | |
|---|---|---|---|---|
| 2005/0288935 | A1* | 12/2005 | Lee | G10L 15/26 704/E15.045 |
| 2015/0088484 | A1* | 3/2015 | Bostick | G06F 40/40 704/2 |
| 2022/0319503 | A1 | 10/2022 | Das et al. | |

OTHER PUBLICATIONS

Notice of Allowance for U.S. Appl. No. 17/218,751, dated Mar. 31, 2021, dated Sep. 27, 2022, 10 pgs.

* cited by examiner

*Primary Examiner* — Ibrahim Siddo
(74) *Attorney, Agent, or Firm* — Taylor English Duma L.L.P.

(57) ABSTRACT

In various examples, systems and methods of the present disclosure combine open and closed dialog systems into an intelligent dialog management system. A text query may be processed by a natural language understanding model trained to associate the text query with a domain tag, intent classification, and/or input slots. Using the domain tag, the natural language understanding model may identify information in the text query corresponding to input slots needed for answering the text query. The text query and related information may then be passed to a dialog manager to direct the text query to the proper domain dialog system. Responses retrieved from the domain dialog system may be provided to the user via text output and/or via a text to speech component of the dialog management system.

20 Claims, 7 Drawing Sheets

CONVERSATIONAL AI PLATFORMS WITH CLOSED DOMAIN AND OPEN DOMAIN DIALOG INTEGRATION

CROSS-REFERENCE TO RELATED APPLICATIONS

This application is a continuation of U.S. patent application Ser. No. 17/218,751, filed Mar. 31, 2021, which is hereby incorporated by reference in its entirety.

BACKGROUND

Users often rely on software applications—such as chatbots, virtual assistants, social bots, and other forms of AI—to submit queries and conduct conversations. However, these software applications generally use dialog systems configured to provide either broad or narrow responses, but not both. For example, closed domain dialog systems are configured to provide specific, informed responses and are trained to answer queries only related to a set of specific topics and/or domains. As such, a user can submit a limited set of queries to a closed domain dialog system (e.g., a chatbot) regarding a specific topic—such as restaurants in a city—and receive specific, detailed content as a response. In contrast, open domain dialog systems are trained to provide human-like responses to queries that are more general or colloquial, and less detailed than those provided by closed domain dialog systems. For example, the user can submit most queries to an open domain dialog system and receive a relevant response; however, responses to task-oriented queries (e.g., "Find me the top 10 restaurants in Seattle") are generally not as specific, or contain as much information as the response received from the closed domain dialog systems.

While users may manually choose to use closed domain dialog systems for task-oriented queries and open domain dialog systems for all other queries, many users are unaware of what type of system will be able to provide a valid response to the user. Thus, many users will simply forego attempting to route different queries to different systems. Moreover, as a user manually switches between open and closed domain dialog systems, the context of the conversation will be lost. As a result, users may not be provided with adequate and/or relevant responses to their queries.

SUMMARY

Embodiments of the present disclosure relate to the joint use of closed domain and open domain dialog systems. Systems and methods are disclosed that transmit textual data representative of a user query to at least one of an open domain dialog system and a closed domain dialog system based on analyzing the textual data. For example, and in contrast to conventional systems, such as those described above, systems and methods of the present disclosure combine open and closed dialog systems into an integrated, intelligent dialog management system. According to embodiments of the present disclosure, when a user submits a text query, or a text query is transcribed from a voice query, the text query may be processed by a natural language understanding model trained to associate the text query with a domain tag, intent classification, and/or input slots. Using a domain tag, the natural language understanding model may identify information in the text query corresponding to input slots needed for answering the text query. The text query and related information may then be passed to a dialog manager to direct the text query to the proper domain.

The dialog manager may support one or more open domain dialog systems as well as one or more closed domain dialog systems. In some embodiments, when the text query, domain tag, and intent classification are received by a dialog manager, the dialog manager may access the domain tag and intent classification for the text query to determine whether the dialog management system includes rules to route the text query to a domain dialog system that corresponds to the domain tag and intent classification. The tag/classification may correspond to a specific closed or open dialog system. If there is no corresponding dialog system, the dialog manager may route the text query to a default domain dialog system. The default domain system may then process and return a response to the text query. When the dialog manager is able to determine a corresponding dialog system, the dialog manager may route the text query to the corresponding dialog system and the default domain dialog system. The specific dialog system may require the dialog manager to execute a policy for the dialog system. Retrieved responses may be provided to the user via text output and/or via a text to speech component of the dialog management system.

In further embodiments, an open domain dialog system may be trained to bias (e.g., weight or direct) its responses towards closed domain dialog systems included as part of the dialog management system. A set of training data may be applied to an existing open domain dialog system to direct responses towards included closed domain dialog systems when the dialog management system is unable to provide a relevant answer to a user query. Accordingly, conversations between a user and the dialog management system may be guided towards discussions the dialog management system is equipped to maintain.

BRIEF DESCRIPTION OF THE DRAWINGS

The present systems and methods for the joint use of closed domain and open domain dialog systems are described in detail below with reference to the attached drawing figures, wherein.

DETAILED DESCRIPTION

Figure 1:
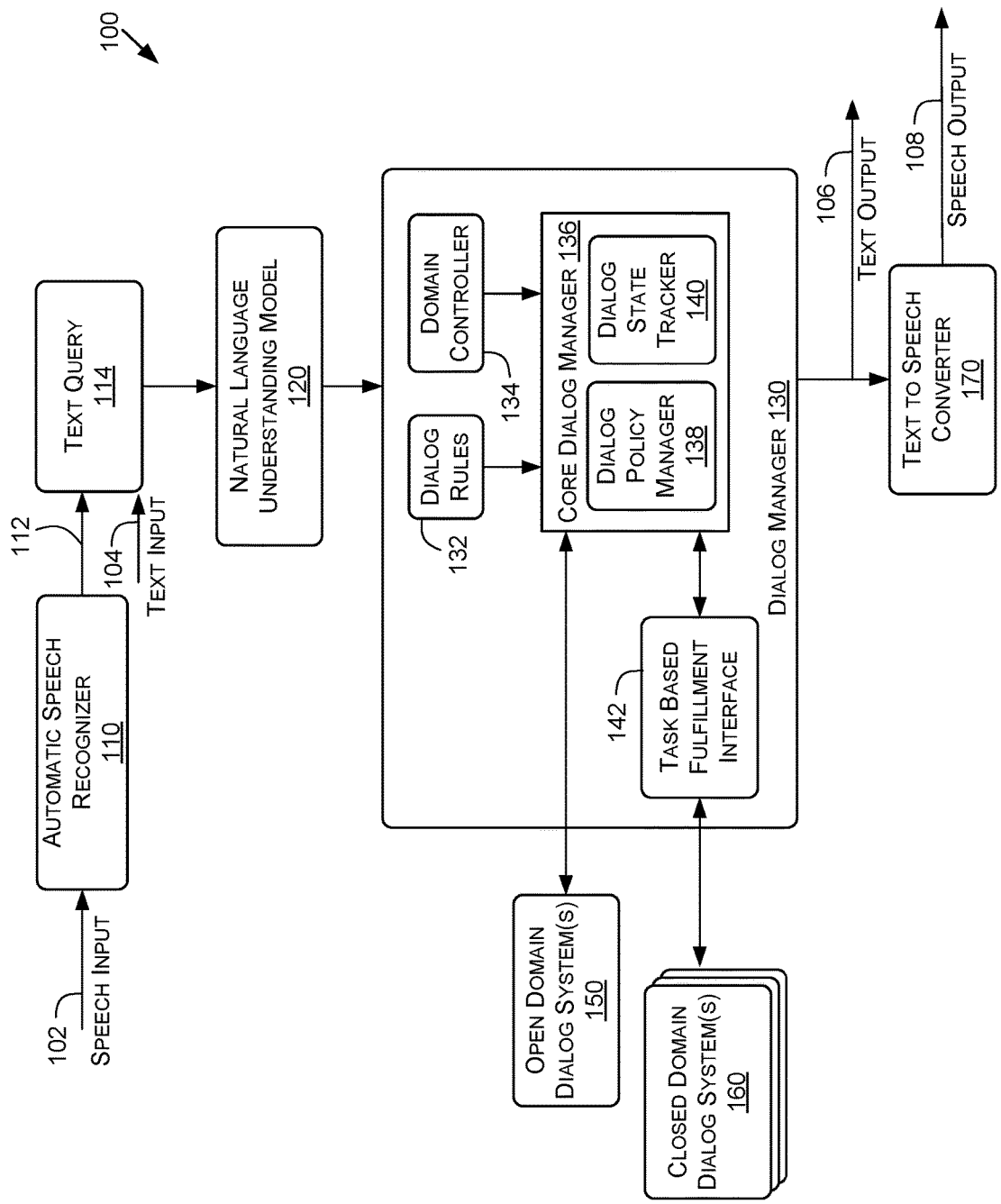
FIG. 1 is an example dialog management system suitable for use in implementing some embodiments of the present disclosure.

Systems and methods are disclosed related to the joint use of closed domain and open domain dialog systems. Although primarily described herein with respect to mobile and desktop digital assistant implementations, this is not intended to be limiting and the systems and methods of the present disclosure may be implemented in any implementation for combining open and closed domain dialog systems. For non-limiting examples, the systems and methods described herein may be implemented for smart speaker applications, smart appliance applications, instant messaging applications, human wearable technology applications, intelligent vehicle applications, and/or other application types that facilitate human-machine interactive exchanges, or perform tasks and/or services for a user based on commands and/or questions.

In some embodiments, open and closed dialog systems may be combined into an intelligent dialog management system for generating responses to user queries. For example, a user may submit a query to the dialog management system via speech input and/or text input. When the user submits the query via speech input, an automatic speech recognizer may process audio data corresponding to the speech input query to generate a textual representation (e.g., a transcript) of the audio data. The textual representation or the speech input and/or a text input—such as input queries received via a chat box—(collectively, "text query") may then be processed and/or analyzed by a natural language understanding model trained to associate the text query with a domain tag, intent classification, and/or input slots.

The domain tag may be a tag for a specific closed domain dialog system. Closed domain dialog systems—and corresponding tags—may include, but are not limited to, navigation systems, weather systems, restaurant systems, sports systems, music or entertainment systems, digital media systems, theater systems, in-vehicle control systems, fitness systems, and/or the like. These tags may be associated with a text query by the natural language understanding model. For example, a query that states, "Take me to the nearest coffee shop" may be tagged with a closed domain tag for restaurants (e.g., a restaurant review application) and/or a tag for navigation (e.g., a navigation application).

The intent classification may describe what the user is trying to accomplish. In some embodiments, the natural language understanding model may be trained to infer an answer to the question of why a user is submitting a query and what the user is wanting to achieve. Accordingly, the natural language understanding model may associate an intent classification with a text query. For example, the same above query that states, "Take me to the nearest coffee shop" may be classified with a navigation intent because the natural language understanding model may determine that the user is trying to navigate to the nearest coffee shop.

Using the one or more domain tag(s), the natural language understanding model may identify information in the text query corresponding to input slots of the one or more corresponding domain(s) needed for answering the text query. For example, a restaurant domain may include input slots for location, price, cuisine category, open/closed, etc. Based on a received text query, the natural language understanding model may associate information from the text query with one or more input slots. For example, a query that states, "What is the weather in Seattle tomorrow evening?" may be tagged with a weather domain that may have input slots for the location, date, time, etc. In this example, the natural language understanding model may associate "Seattle" with a location input slot, "tomorrow" with a date input slot, and evening with a time input slot.

In some embodiments, the text query and related information (e.g., domain tag, intent classification, and/or input slot data) may then be passed to a dialog manager to direct the text query to the proper domain. The dialog manager may support one or more open domain dialog systems—such as NVIDIA's MISTY, BLENDER, or other conversational AI bot—as well as one or more closed domain dialog systems—such as one or more specific task-oriented bots. The dialog management system may include any number of dialog systems. A developer may configure rules (e.g., else if statements) to route (e.g., transmit) text queries to specific domains.

In some embodiments, when the text query and related information (e.g., domain tag, intent classification, and/or input slot data) are received, the dialog manager may access the domain tag and intent classification for the text query. The domain tag and intent classification may be used to determine whether the dialog management system includes rules to route the text query to a domain dialog system that corresponds to the domain tag and intent classification. The domain tag and intent classification may correspond to a specific closed or open dialog system. In some embodiments, if there is no corresponding dialog system, the dialog manager may route the text query to a default domain dialog system—such as an open domain dialog system. The open domain dialog system may then process and return a response to the text query.

In some embodiments, when the dialog manager is able to determine a corresponding closed dialog system, the dialog manager may route the text query to the corresponding closed dialog system in addition to the open domain dialog system (e.g., so the open domain dialog system can maintain a state of the conversation). The specific closed dialog system may require the dialog manager to execute a policy for the dialog system. For example, the dialog system may require that input slot information be filled in (e.g., find_weather (location="seattle", day="monday", time="evening")) to allow a fulfillment component to interface with the domain dialog system and retrieve a response. Retrieved responses may be provided to the user via text output and/or via a text to speech component of the dialog management system.

In some embodiments, while a user is interacting with the dialog management system, the user may input queries that are routed to and fulfilled by one or more open domain systems as well as one or more closed domain systems. In such instances, the dialog management system may maintain a dialog state (e.g., a conversation context) between open domain systems and closed domain systems. For example, when the dialog manager determines that a text query should be routed to an identified closed domain dialog system, the dialog manager may route the text query to both the identified closed domain dialog system as well as an open domain dialog system (e.g., default domain dialog system). Both dialog systems may then process the text query.

Processing a text query by both an identified closed domain dialog system as well as an open domain dialog system may allow for the open domain dialog system to update an internal dialog state for the open domain dialog system, which may be stored within the open domain dialog system. The dialog manager may also record/store a dialog state based on the text query. The dialog state may refer to a history, an estimate of a user's intent, and/or status of a user's conversation with a digital assistant application. In some embodiments, the identified closed domain dialog system and the open domain dialog system may each return a response to the text query. However, when the text query is directed to the identified closed domain dialog system, the dialog manager may then disregard the response received from the open domain dialog system. The response returned by the closed domain dialog system may then be provided to the user. Advantageously, by routing text queries to both the identified closed domain dialog system and the open domain dialog system, if the user submits a subsequent query that is routed to the open domain dialog system, the open domain dialog system may have an understanding of the dialog state in order to provide the user with more relevant results than would otherwise be available.

In embodiments where the text query is routed only to the open domain dialog system, the response returned by the open domain dialog system may be considered by the dialog manager and used to update the dialog state stored in the dialog manager. Advantageously, a subsequent user query that is routed to a closed domain dialog system may access the dialog state stored in the dialog manager. For example, the dialog manager may be able to extract information from the dialog state to fill in input slots required for the system to submit the query to the closed domain dialog system.

In further embodiments, an open domain dialog system may be trained to bias its responses towards closed domain dialog systems included as part of the dialog management system. For example, the dialog management system may include closed domain dialog systems for restaurants, weather, travel, sports, etc. A developer may take an existing open domain dialog system and apply a set of training data to the existing open domain dialog system to direct responses towards the included closed domain dialog systems when the dialog management system is unable to provide a relevant answer to a user query. For example, if a user asks, "What is the population of Seattle?" Since the dialog management system does not have a closed domain dialog system to answer this query, the query may be routed to the open domain dialog system, which will also be unable to provide population information. However, based on the trained bias, the open domain dialog system may redirect the conversation towards a closed domain dialog system. The open domain dialog system may respond with, "I don't know about that, but I know it has some great restaurants." Advantageously, the conversation between the user and the dialog management system may be prevented from digressing in an unwanted direction.

With reference to FIG. 1, FIG. 1 is an example dialog management system 100 (alternatively referred to herein as "system 100), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 100 may include similar components, features, and/or functionality as example computing device 600 of FIG. 6 and/or example data center 700 of FIG. 7.

The dialog management system 100 may include, among other things, an automatic speech recognizer 110, a natural language understanding model 120, a dialog manager 130, one or more open domain dialog system(s) 150, one or more closed domain dialog systems 160, and a text to speech converter 170.

In operation, a user may submit a query to the dialog management system 100 via speech input 102 and/or text input 104. Though not depicted, such queries may be submitted to the dialog management system 100 via one or more of a mobile device, a desktop device, a smart appliance, a human wearable device, a vehicle interface, and/or another device supporting or communicatively coupled to a device executing a digital assistant interface. When the user submits the query via speech input 102, the automatic speech recognizer 110 may process audio data corresponding to the speech input 102 to generate a textual representation 112 (e.g., a transcript) of the audio data. The textual representation 112 or the speech input 102 and/or a text input 104 (collectively depicted and described as text query 114) may then be passed to the natural language understanding model 120, which may process and/or analyze the text query 114. The natural language understanding model 120 may be trained to associate the text query 114 with a domain tag, an intent classification, and/or one or more input slots.

The domain tag may be a tag for a specific closed domain dialog system of the one or more closed domain dialog system(s) 160. The closed domain dialog systems 160—and corresponding tags—may include, but are not limited to, navigation systems, weather systems, restaurant systems, sports systems, music systems, movie theater systems, and/or the like. Tags corresponding to the one or more closed domain dialog system(s) 160 may be associated with the text query 114 by the natural language understanding model 120.

The natural language understanding model 120 may determine an intent for the text query 114 by predicting why the user is submitting the text query 114 and what the user is wanting to achieve via the text query 114. Accordingly, the natural language understanding model 120 may associate one or more determined intent classifications with the text query 114. For example, the natural language understanding model 120 may associate a navigation intent and a restaurant intent to the text query 114 when textual data for the text query 114 states, "What is the best barbeque in Seattle." The natural language understanding model 120 may associate these intents with the text query 114 because the natural language understanding model 120 may predict that the user wants the dialog management system 100 to provide the user with information about a barbeque restaurant in Seattle with the best reviews.

The natural language understanding model 120 may further use one or more domain tag(s) associated with the text query 114 to identify information in the text query 114 corresponding to input slots of the one or more corresponding domain(s). The input slots may operate as placeholders for values needed by the one or more open domain dialog system(s) 150 and/or the one or more closed domain dialog system(s) 160 for answering the text query 114. Based on the received text query 114, the natural language understanding model 120 may associate information from the text query 114 with one or more input slots.

In some embodiments, the text query 114, one or more domain tags, one or more intent classifications, and/or input slot data associated with the text query 114 may be passed to the dialog manager 130 to direct the text query 114 to the proper domain. The dialog manager may support the one or more open domain dialog system(s) 150 as well as one or more closed domain dialog system(s) 160. The dialog management system may include any number of dialog systems, each of which may be designated as one of the open domain dialog system(s) 150, one of the closed domain dialog system(s) 160, and/or a default domain dialog system by a developer.

The dialog manager 130 may include dialog rules 132, a domain controller 134, a core dialog manager 136—that may include a dialog policy manager 138 and a dialog state tracker 140—and a task fulfillment interface 142. The dialog rules 132 may include routing rules for routing the text query 114 to a specific domain based on a domain tag. In operation, when the text query 114 and the corresponding domain tag(s), intent classification(s), and/or input slot data are received by the dialog manager 130, the dialog manager may access the domain tag and intent classification for the text query. The domain tag and intent classification may be used to determine whether the dialog rules 132 includes rules to route the text query 114 to a domain dialog system that corresponds to the domain tag and intent classification. For example, if the text query 114 is associated with a specific domain tag that is associated with rules in the dialog rules 132, then the text query 114 may be transmitted to a corresponding specific domain based on the rules—such as one of the closed domain dialog system(s) 160. If the text query 114 is not associated with a specific domain tag or the domain tag is not associated with any rules in the dialog rules 132, then the text query may be routed to a default domain—such as one of the open domain dialog system(s) 150.

In some embodiments, policies corresponding to each of the one or more open domain dialog system(s) 150 and/or the one or more closed domain dialog system(s) 160 may be stored in the dialog policy manager 138. When a domain tag for the text query 114 corresponds to a determined domain dialog system, the dialog manager 130 may access the dialog policy manager 138 to identify a corresponding policy. The one or more open domain dialog system(s) 150 and/or the one or more closed domain dialog system(s) 160 may require the dialog manager 130 to execute a policy for a determined domain dialog system. Based on one or more policies corresponding to the specific domain, the dialog manager 130 may generate a request for the determined domain dialog system. For example, a request for the determined domain dialog system may require that input slot information from the text query 114 be filled in (e.g., find_weather (location="seattle", day="monday", time="evening")) to allow the task based fulfillment interface 142 to communicate with the determined domain dialog system.

When the text query 114 is communicated to the one or more open domain dialog system(s) 150 and/or the one or more closed domain dialog system(s) 160, the text query may be processed by the one or more open domain dialog system(s) 150 and/or the one or more closed domain dialog system(s) 160 to return one or more response(s) (e.g., a textual response) to the text query 114. One of the returned responses may be provided to the user via text output 106 and presented to the user. For example, the text may be displayed on a user's mobile device, a vehicle display, a wearable device, etc. Additionally or alternatively, the response (e.g., text output 106) may be passed to the text to speech converter 170. The text to speech converter 170 may process the response to generate audio data corresponding to the response to generate speech output 108. The speech output 108 may be provided to the user via a user's mobile device, a smart speaker, a vehicle's audio system, a wearable device, etc.

In some embodiments, the dialog state tracker 140 may track interactions with the one or more open domain dialog system(s) 150 and/or the one or more closed domain dialog system(s) 160 to maintain a dialog state for a user. The dialog state may refer to a history, an estimate of a user's intent, and/or status of a user's conversation with a digital assistant application. The dialog state tracker 140 may maintain a dialog state based on one or more received text queries 114 and/or one or more responses received from the one or more open domain dialog system(s) 150 and/or the one or more closed domain dialog system(s) 160, as discussed further in association with FIGS. 2A and 2B.

In some embodiments, one or more of the open domain dialog system(s) 150 may be trained to bias responses towards one or more of the closed domain dialog system(s) 160. For example, the dialog management system 100 may include closed domain dialog system(s) 160 that are trained to fulfil text queries 114 regarding restaurants, weather, travel, sports, etc. In such embodiments, a set of training data may be applied to one or more of the open domain dialog system(s) 150 to train the one or more of the open domain dialog system(s) 150 to direct responses towards one or more of the closed domain dialog system(s) 160 included in the dialog management system 100 when the dialog management system is unable to provide a relevant answer to a text query 114. For example, if the dialog management system 100 does not have a domain dialog system in the open domain dialog system(s) 150 or the closed domain dialog system(s) 160 to answer a text query 114, the text query 114 may be routed to a default domain dialog system, which may be unable to provide an answer. However, based on the trained bias, the default domain dialog system may direct the conversation towards one or more closed domain dialog system(s) 160 and/or one or more open domain dialog system(s) 150. Accordingly, the conversation between the user and the dialog management system 100 may be prevented from digressing in an unwanted direction where the dialog management system may be unlikely to provide adequate responses to future text queries 114 from the user.

Figure 2A:
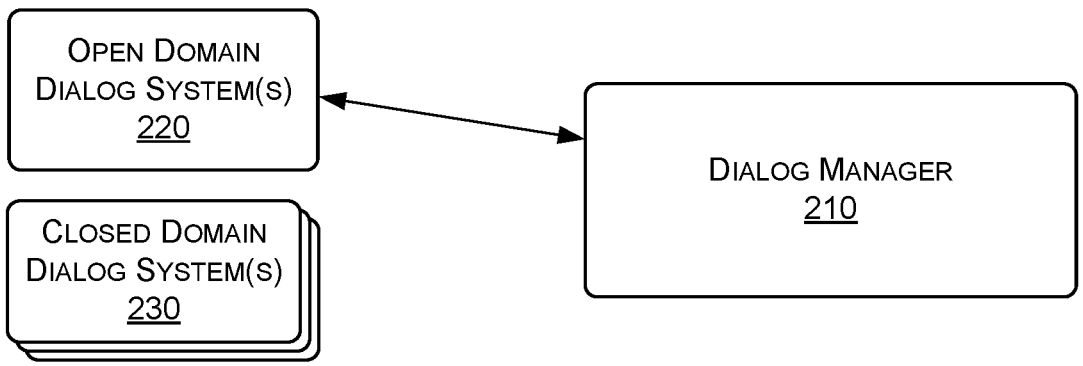
FIGS. 2A-2B are example routing operations for text queries suitable for use in implementing some embodiments of the present disclosure.
Figure 2B:
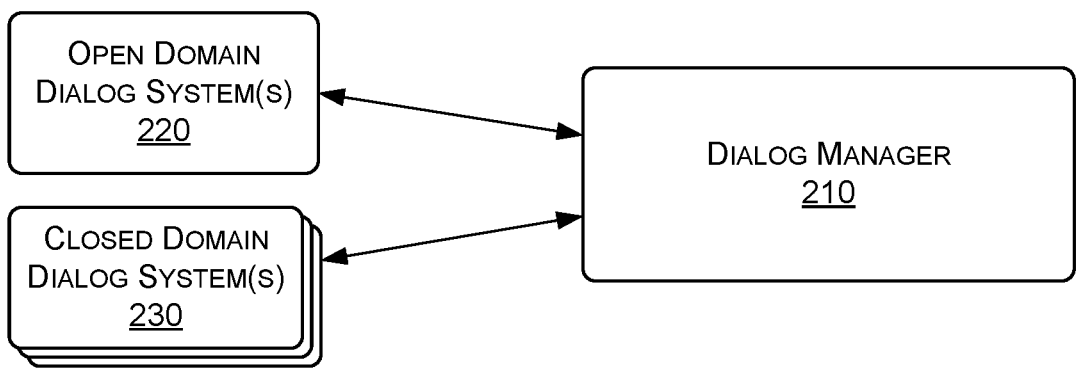

Turning now to FIGS. 2A-2B, FIGS. 2A-2B illustrate example routing operations for text queries, suitable for use in implementing some embodiments of the present disclosure. In some embodiments, such as that shown in FIG. 2A, a dialog manager 210 may route a text query only to the open domain dialog system(s) 220. The open domain dialog system(s) 220 may process the text query and return a response to the dialog manager 210. The response may be considered by the dialog manager and used to update the dialog state stored in the dialog manager 210. In some embodiments the dialog manager 210 may also record/store a dialog state based on the text query. Accordingly, a subsequent text query that is routed to a closed domain dialog system(s) 230 may access the dialog state stored in the dialog manager 210. For example, the dialog manager 210 may be able to extract information from the dialog state to fill in input slots required for the dialog manager 210 to submit a query to the closed domain dialog system(s) 230. For example, when talking about Seattle in a conversation with an open domain dialog system(s) 220, the user may then say, "where is the best coffee shop?" and the internal stored state in the dialog manager 210—which may now include a location state of "Seattle"—may be used to generate a query for the closed domain dialog system(s) 230 that includes best coffee shops in Seattle, without requiring the user to again specify the location they are referring to.

With reference to FIG. 2B, a dialog manager 210 may route a text query to the open domain dialog system(s) 220 as well as of the closed domain dialog system(s) 230. In such instances, the dialog management system 210 may maintain a dialog state (e.g., conversation context) between the open domain dialog system(s) 220 and the closed domain dialog system(s) 230. For example, when the dialog manager 210 determines that a text query should be routed to an identified closed domain dialog system of the closed domain dialog system(s) 230, the dialog manager 210 may route the text query to both the identified closed domain dialog system as well as to one or more open domain dialog system(s) 220—such as a default domain dialog system. The text query may then be processed by both the open domain dialog system(s) 220 and the identified closed domain dialog system.

Processing the text query by both the identified closed domain dialog system of the closed domain dialog system(s) 230 as well as the open domain dialog system(s) 220 may allow for the open domain dialog system(s) 220 to update an internal dialog state for the open domain dialog system(s) 220, which may be stored within the open domain dialog system(s) 220. In some embodiments the dialog manager 210 may also record/store a dialog state based on the text query. In further embodiments, the dialog manager 210 may receive a response from the closed domain dialog system(s) 230 and may transmit the received response to the open domain dialog system(s) 220. The open domain dialog system(s) 220 may receive the response provided by the closed domain dialog system(s) 230 and update the internal dialog state of the open domain dialog system(s) 220 based on the response. Responses provided by the open domain dialog system(s) 220 may then incorporate state information saved in the open domain dialog system(s) 220 based on the updated internal dialog state.

In some embodiments, the identified closed domain dialog system and the open domain dialog system(s) 220 may each return a response to the text query. However, when the text query is directed to the identified closed domain dialog system of the closed domain dialog system(s) 230, the dialog manager 210 may disregard any response received from the open domain dialog system(s) 220. The response returned by the closed domain dialog system(s) 230 may then be provided to the user. By routing text queries to both the identified closed domain dialog system and the open domain dialog system(s) 220, if a user submits a subsequent query that is routed to the open domain dialog system(s) 220, the open domain dialog system(s) 220 may access the dialog state to enable the open domain dialog system(s) 220 to understand a context of the text query in order to provide the user with more relevant results than would otherwise be available.

Figure 3:
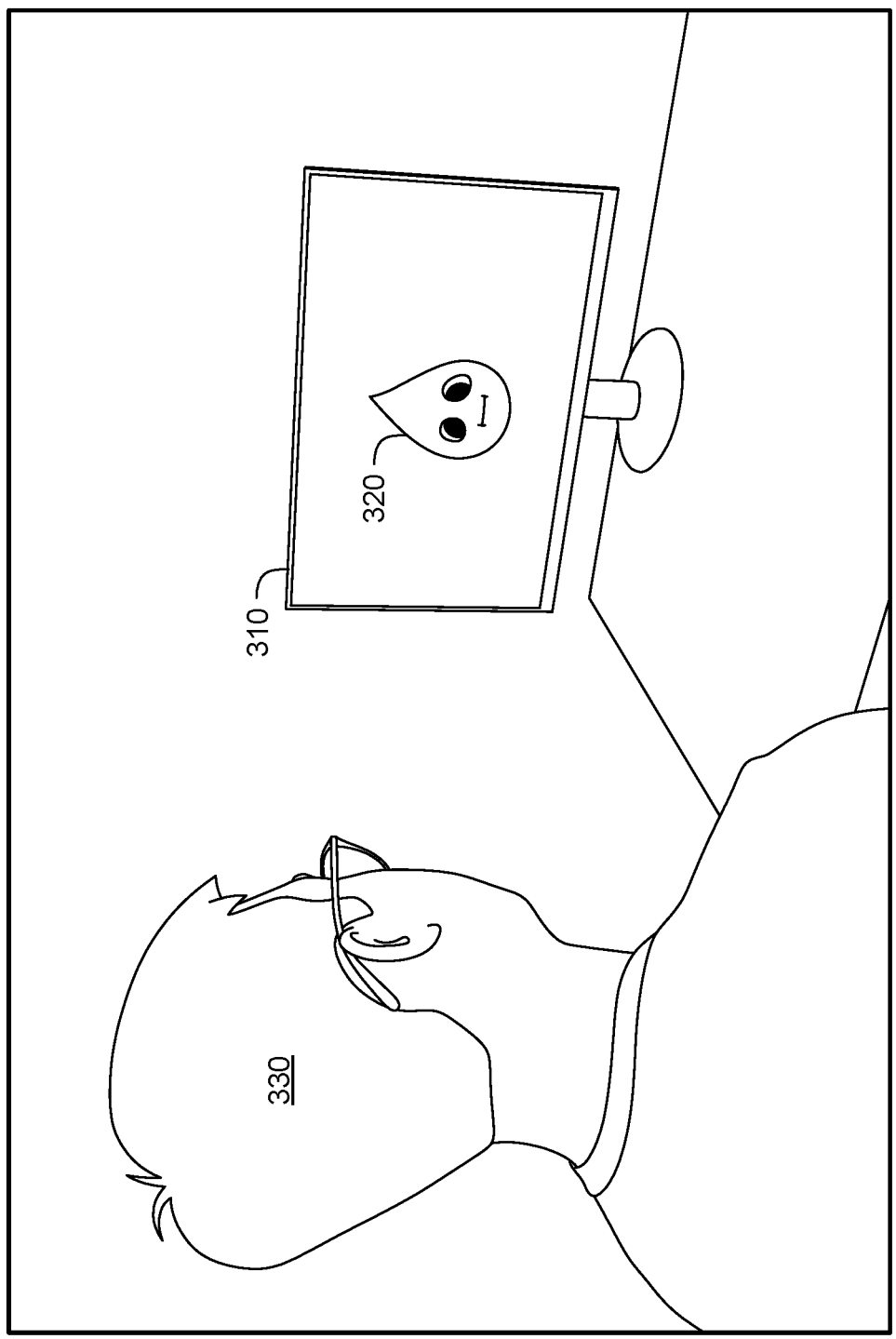
FIG. 3 is an example user interface suitable for use in implementing some embodiments of the present disclosure.

Now referring to FIG. 3, FIG. 3 illustrates an example user interface, suitable for use in implementing some embodiments of the present disclosure. FIG. 3 includes device 310, AI graphic 320, and user 330. In various embodiments, device 310 may be a smart phone, a laptop computer, a tablet computer, a desktop computer, a wearable device, a game console, a virtual reality system (e.g., a headset, a computer, a game console), a streaming device, (e.g., an NVIDIA SHIELD), a smart-home device, a vehicle computing device, another type of device that may perform tasks and/or services for the user 330 based on commands and/or questions, depending on the embodiment or implementation, and/or a combination thereof. The AI graphic 320 may be an animated character, avatar, or other personification. In operation, the user 330 may submit a query to a dialog management system, such as system 100 of FIG. 1, via speech input and/or text input to the device 310. The device 310 may receive and process the query by the dialog management system. In some embodiments, the dialog management system may cause the AI graphic 320 to provide an indicator to the user 330 via the device 310 to indicate that the query is being processed. For example, the AI graphic 320 may alter a facial expression of the AI graphic 320 to mimic a person thinking. Once the dialog management system has processed the query, a response may be provided to the user 330 via the device 310. In some embodiments, the AI graphic 320 may appear to voice the response back to the user 330 by matching mouth poses of the AI graphic 320 to sound reflections of audio data of the response.

Figure 4:
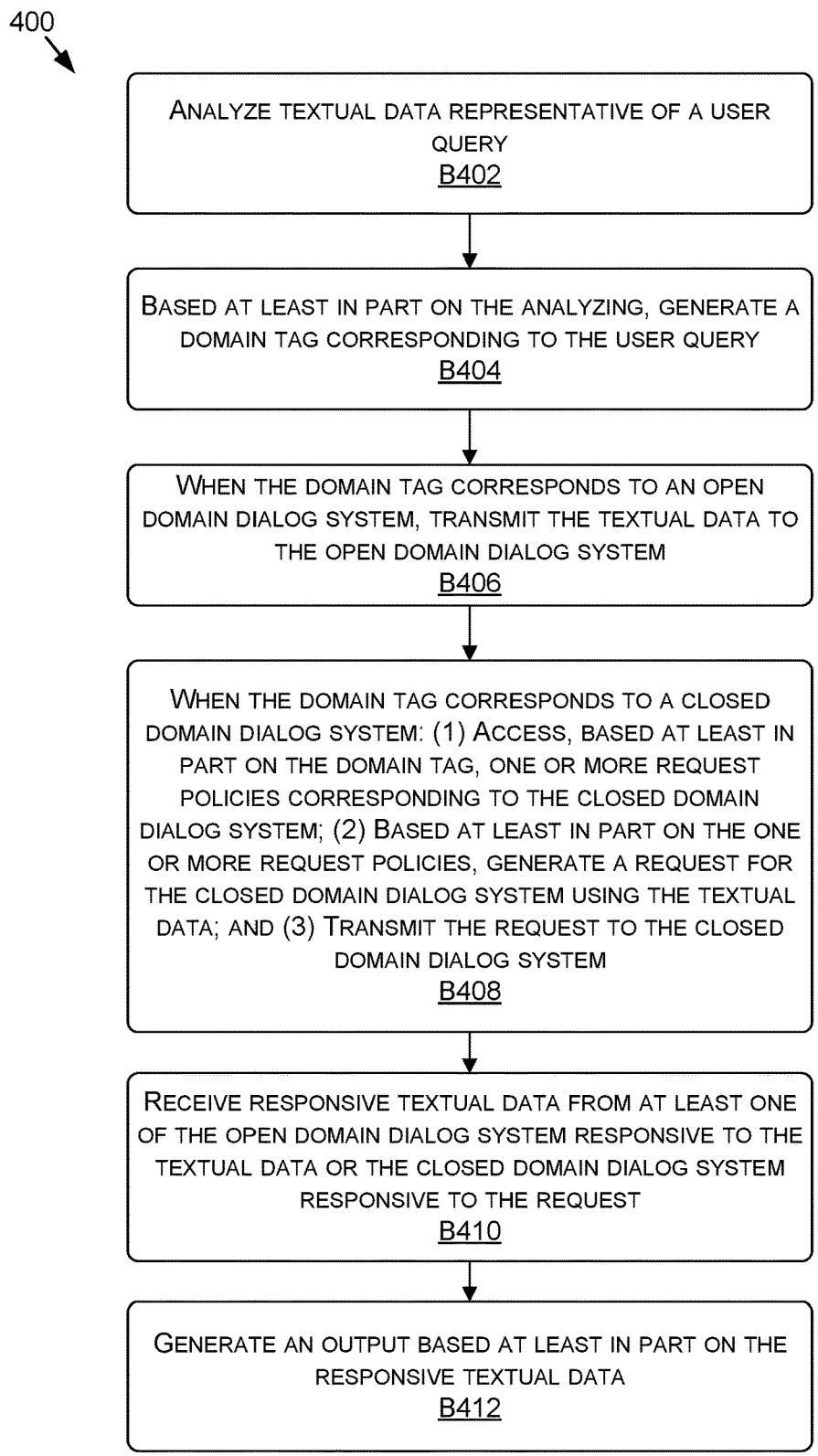
FIG. 4 is a flow diagram for generating an output to a user query suitable for use in implementing some embodiments of the present disclosure.
Figure 5:
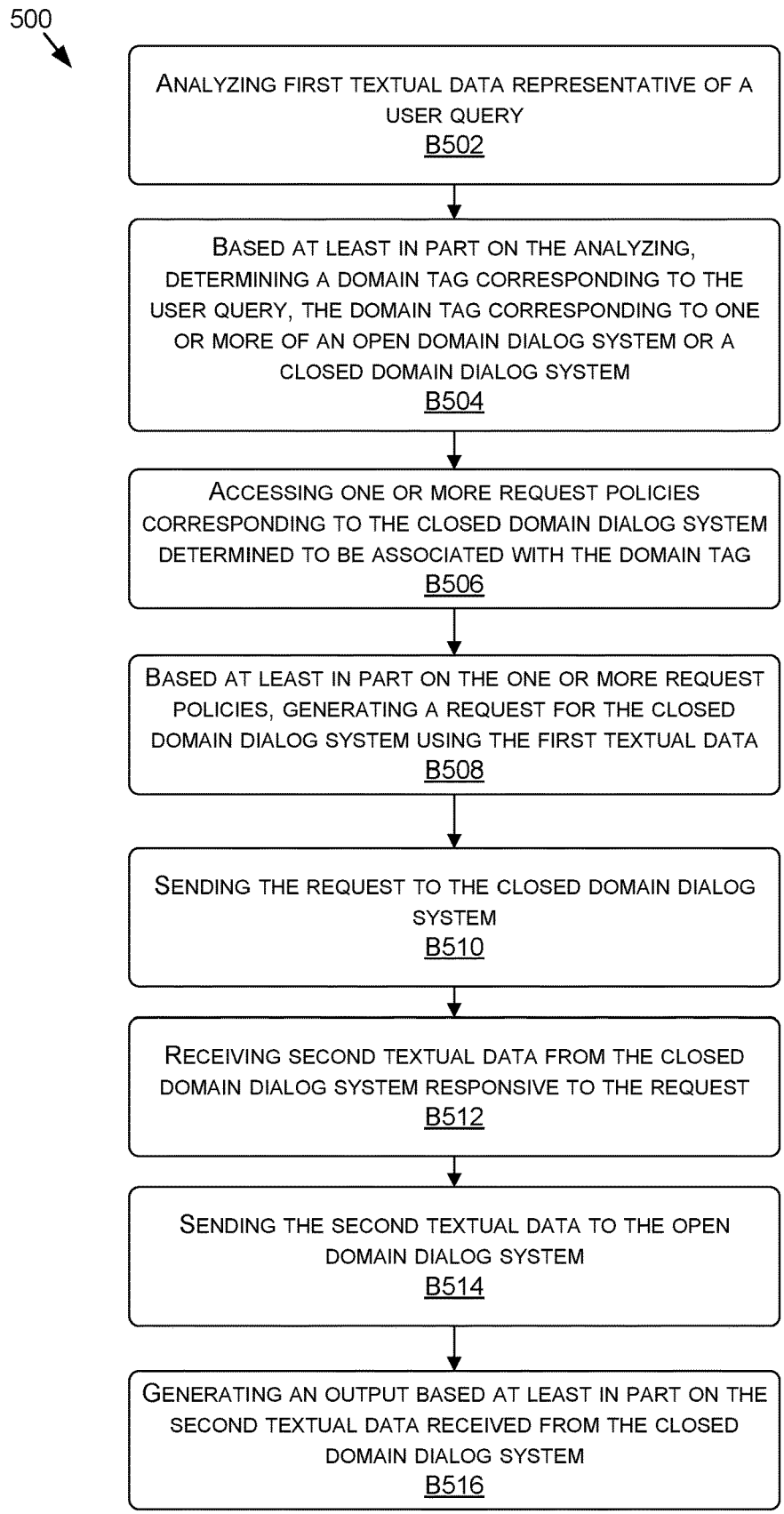
FIG. 5 is a flow diagram for generating an output to a user query suitable for use in implementing some embodiments of the present disclosure.

Now referring to FIGS. 4-5, each block of methods 400 and 500, described herein, comprise a computing process that may be performed using any combination of hardware, firmware, and/or software. For instance, various functions may be carried out by a processor executing instructions stored in memory. The methods 400 and 500 may also be embodied as computer-usable instructions stored on computer storage media. The methods 400 and 500 may be provided by a standalone application, a service or hosted service (standalone or in combination with another hosted service), or a plug-in to another product, to name a few. In addition, methods 400 and 500 are described, by way of example, with respect to the system 100 of FIG. 1. However, these methods may additionally or alternatively be executed by any one system, or any combination of systems, including, but not limited to, those described herein.

With reference to FIG. 4, FIG. 4 is a flow diagram showing a method 400 for generating an output to a user query, in accordance with some embodiments of the present disclosure. The method 400, at block B402, includes analyzing textual data representative of a user query. For example, the textual representation 112 or the speech input 102 and/or a text input 104 (collectively depicted and described as text query 114) may then be passed to the natural language understanding model 120, which may process and/or analyze the text query 114.

The method 400, at B404, includes generating a domain tag corresponding to the user query based at least in part on the analyzing. For example, the natural language understanding model 120 may be trained to associate the text query 114 with a domain tag, an intent classification, and/or one or more input slots.

The method 400, at B406, includes transmitting the textual data to the open domain dialog system when the domain tag corresponds to an open domain dialog system. For example, if the text query 114 is associated with a specific domain tag that is associated with rules in the dialog rules 132, then the text query 114 may be transmitted to a corresponding specific domain based on the rules.

The method 400, at B408, includes, when the domain tag corresponds to a closed domain dialog system, (1) accessing, based at least in part on the domain tag, one or more request policies corresponding to the closed domain dialog system; (2) based at least in part on the one or more request policies, generating a request for the closed domain dialog system using the textual data; and (3) transmitting the request to the closed domain dialog system. For example, when a domain tag for the text query 114 corresponds to a determined domain dialog system, the dialog manager 130 may access the dialog policy manager 138 to identify a corresponding policy. The one or more open domain dialog system(s) 150 and/or the one or more closed domain dialog system(s) 160 may require the dialog manager 130 to execute a policy for a determined domain dialog system. Based on one or more policies corresponding to the specific domain, the dialog manager 130 may generate a request for the determined domain dialog system.

The method 400, at B410, includes receiving responsive textual data from at least one of the open domain dialog system responsive to the textual data or the closed domain dialog system responsive to the request. For example, when the text query 114 is communicated to the one or more open domain dialog system(s) 150 and/or the one or more closed domain dialog system(s) 160, the text query may be processed by the one or more open domain dialog system(s) 150 and/or the one or more closed domain dialog system(s) 160 to return one or more response(s) (e.g., a textual response) to the text query 114.

The method 400, at B412, includes generating an output based at least in part on the responsive textual data. For example, a textual response may be displayed on a user's mobile device, a vehicle display, a wearable device, etc. Additionally or alternatively, the response (e.g., text output 106) may be passed to the text to speech converter 170. The text to speech converter 170 may process the response to generate audio data corresponding to the response to generate speech output 108. The speech output 108 may be provided to the user via a user's mobile device, a smart speaker, a vehicle's audio system, a wearable device, etc.

Now referring to FIG. 5, FIG. 5 is a flow diagram showing a method 500 for generating an output to a user query, in accordance with some embodiments of the present disclosure. The method 500, at block B502, includes analyzing first textual data representative of a user query. For example, the textual representation 112 or the speech input 102 and/or a text input 104 (collectively depicted and described as text query 114) may then be passed to the natural language understanding model 120, which may process and/or analyze the text query 114.

The method 500, at block B504, includes determining a domain tag corresponding to the user query based at least in part on the analyzing, based at least in part on the analyzing, the domain tag corresponding to one or more of an open domain dialog system or a closed domain dialog system. For example, the natural language understanding model 120 may be trained to associate the text query 114 with a domain tag, an intent classification, and/or one or more input slots.

The method 500, at block B506, includes accessing one or more request policies corresponding to the closed domain dialog system determined to be associated with the domain tag. For example, when a domain tag for the text query 114 corresponds to a determined domain dialog system, the dialog manager 130 may access the dialog policy manager 138 to identify a corresponding policy.

The method 500, at block B508, includes generating a request for the closed domain dialog system using the first textual data based at least in part on the one or more request policies. For example, based on one or more policies corresponding to the specific domain, the dialog manager 130 may generate a request for the determined domain dialog system.

The method 500, at block B510, includes sending the request to the closed domain dialog system. For example, if the text query 114 is associated with a specific domain tag that is associated with rules in the dialog rules 132, then the text query 114 may be transmitted to a corresponding specific domain based on the rules.

The method 500, at block B512, includes receiving second textual data from the closed domain dialog system responsive to the request. For example, the dialog manager 210 may receive a response from the closed domain dialog system(s) 230.

The method 500, at block B514, includes sending the second textual data to the open domain dialog system. For example, the dialog manager 210 may transmit the received response from the closed domain dialog system(s) 230 to the open domain dialog system(s) 220.

The method 500, at block B516, includes generating an output based at least in part on the second textual data received from the closed domain dialog system. For example, responses provided by the open domain dialog system(s) 220 may then incorporate state information saved in the open domain dialog system(s) 220 based on the updated internal dialog state.

Example Computing Device

Figure 6:
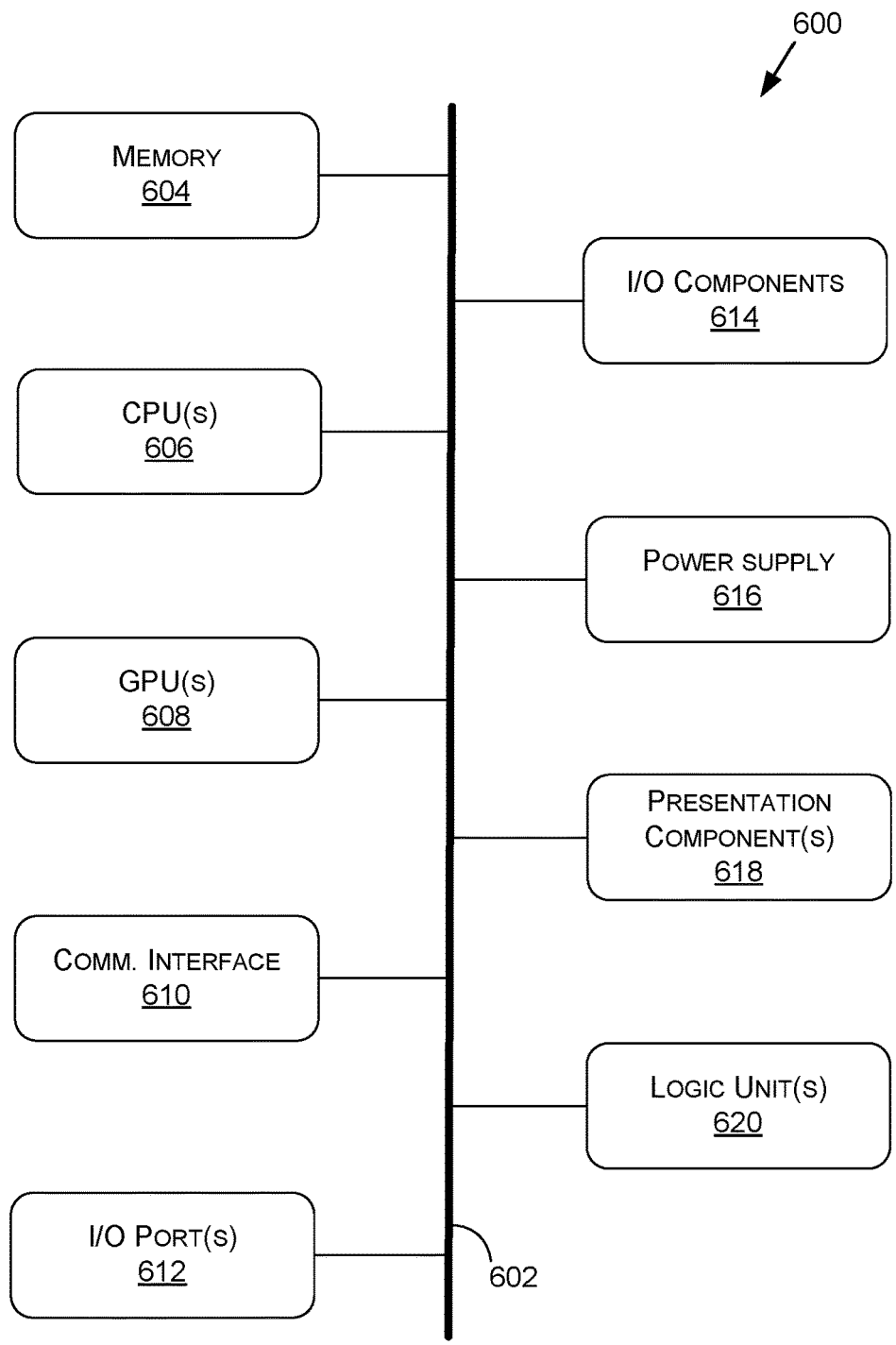
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
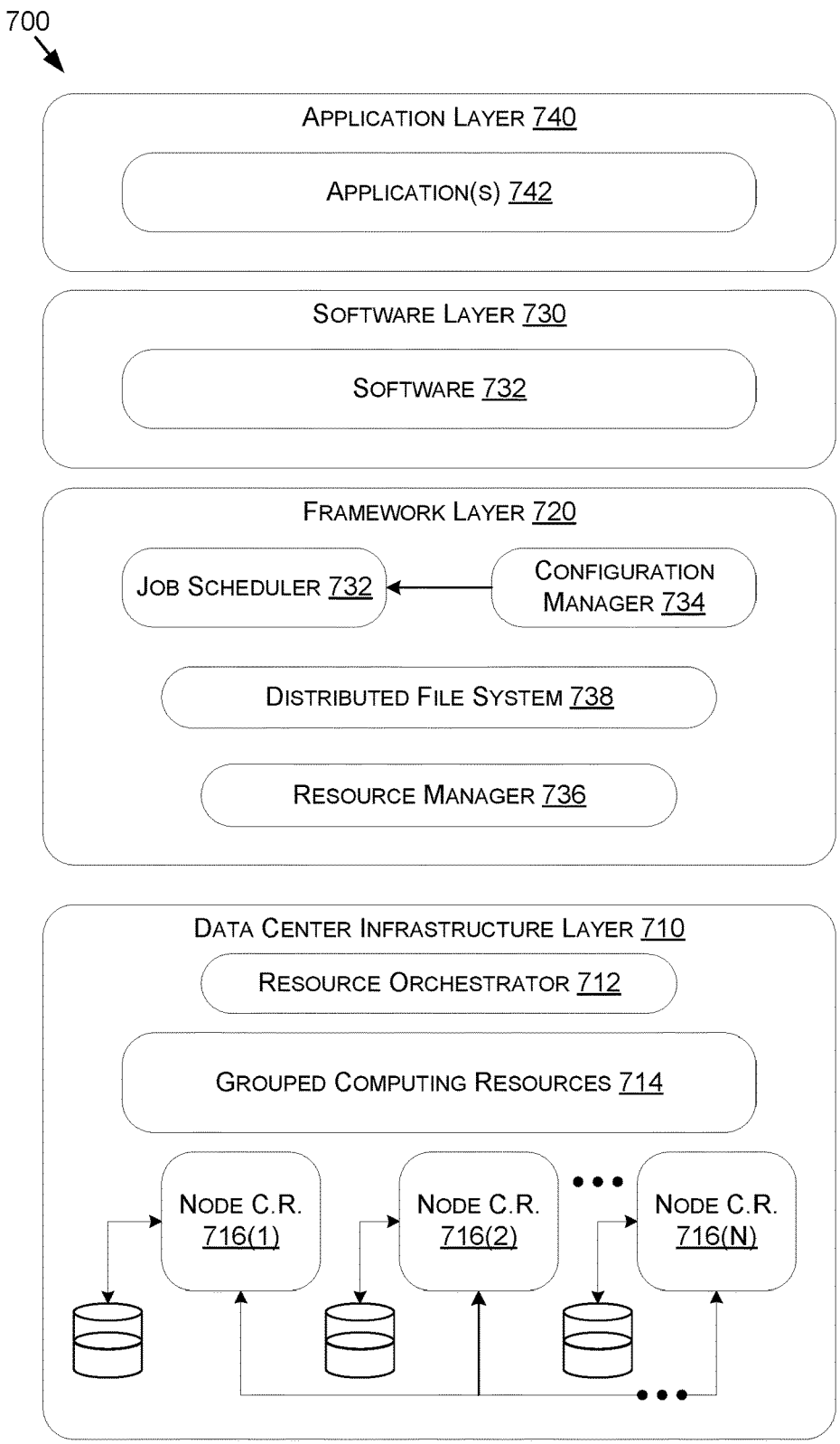
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 722 may configure or otherwise control one or more node C.R.s 716(1)-716(N) and/or grouped computing resources 714. In at least one embodiment, resource orchestrator 722 may include a software design infrastructure (SDI) management entity for the data center 700. The resource orchestrator 722 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 1036 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising processing circuitry to:
   generate a determination of whether at least one user query corresponds to an open domain dialog system or a closed domain dialog system;
   based at least on the determination, send first data corresponding to the at least one user query to one of the open domain dialog system or the closed domain dialog system;
   receive, based at least on the first data corresponding to the at least one user query, second data indicative of at least one first response from the open domain dialog system or data indicative of at least one second response from the closed domain dialog system; and
   generate at least one output based at least on one or more of the at least one first response or the at least one second response.

2. The processor of claim 1, wherein the processing circuitry is further to access one or more request policies corresponding to the closed domain dialog system, and the first data corresponding to the at least one user query is determined based at least on the one or more request policies.

3. The processor of claim 2, wherein the one or more request policies are based at least on one or more of:
   at least one domain tag associated with the at least one user query,
   at least one intent classification associated with the at least one user query, or
   at least one input slot associated with the at least one user query.

4. The processor of claim 1, wherein the processing circuitry is further to:
   analyze the at least one user query to determine one or more indications of one or more of:
      at least one intent classification associated with the at least one user query,
      at least one domain tag associated with the at least one user query,
      or at least one input slot associated with the at least one user query, and
   the sending the first data corresponding to the at least one user query is to the open domain dialog system when the one or more indications correspond to the open domain dialog system.

5. The processor of claim 4, wherein the sending the first data corresponding to the at least one user query is to the closed domain dialog system when the one or more indications correspond to the closed domain dialog system.

6. The processor of claim 1, wherein the output includes at least one of:
   one or more displays of text corresponding to the second data, or
   one or more presentations of audio corresponding to audio data generated based at least on the second data using one or more text-to-speech (TTS) algorithms.

7. The processor of claim 1, wherein the sending the first data to the closed domain dialog system includes generating at least one request based at least on the first data, the generating the at least on request including populating one or more input slots corresponding to the at least one request using one or more portions of the at least one user query.

8. The processor of claim 1, wherein at least a portion of the second data indicates the at least one second response from the closed domain dialog system and the portion of the second data is used to transmit one or more indications of the at least one second response to the open domain dialog system to cause the open domain dialog system to maintain a context of an ongoing conversation corresponding to the at least one user query and the at least one output.

9. The processor of claim 1, wherein the open domain dialog system is trained to bias responses toward domains associated with the closed domain dialog system or one or more other closed domain dialog systems.

10. The processor of claim 1, wherein the processor is comprised in at least one of:
    a system of an autonomous or semi-autonomous machine;
    a system implemented using an edge device;
    a system implemented using a robot;
    a system incorporating one or more virtual machines (VMs);
    a system implemented at least partially in a data center; or
    a system implemented at least partially using cloud computing resources.

11. A system comprising:
    one or more processing units to execute operations comprising:
       receiving data indicating at least one response from at least one closed domain dialog system to at least one request corresponding to at least one user query;
       providing, using the data, at least one open domain dialog system with at least one indication of the at least one response; and
       generating at least one output based at least on the data.

12. The system of claim 11, wherein the operations further include:
    accessing one or more request policies corresponding to the at least one closed domain dialog system; and
    generating the at least one request based at least on the one or more request policies.

13. The system of claim 12, where the one or more request policies are based at least on one or more of:
- at least one domain tag associated with the at least one user query, at least one intent classification associated with the at least one user query, or
- at least one input slot associated with the at least one user query.

14. The system of claim 11, wherein the at least one open domain dialog system uses the at least one indication to update one or more dialog state trackers maintained using the at least one open domain dialog system.

15. The system of claim 14, wherein the operations further include:
- sending one or more indications of the at least one user query to the at least one open domain dialog system, and the at least one open domain dialog system uses the one or more indications to update the one or more dialog state trackers.

16. The system of claim 11, wherein the system is comprised in at least one of:
- a system of an autonomous or semi-autonomous machine;
- a system implemented using an edge device;
- a system implemented using a robot;
- a system incorporating one or more virtual machines (VMs);
- a system implemented at least partially in a data center; or
- a system implemented at least partially using cloud computing resources.

17. A method comprising:
- receiving first data indicating at least one first response from at least one open domain dialog system to at least one user query;
- generating at least one request for at least one closed domain dialog system using the data indicating the at least one first response;
- receiving second data indicating at least one second response, from the at least one closed domain dialog system, responsive to the at least one request; and
- generating at least one output based at least on the second data.

18. The method of claim 17, further comprising updating one or more dialog states using the first data indicating the at least one first response to the at least one user query, wherein the generating the at least one request is based at least on the one or more dialog states updated using the first data.

19. The method of claim 17, wherein the at least one output corresponds to at least one of the first data indicating the at least one response or the second data indicating the at least one second response.

20. The method of claim 17, wherein the method further includes:
- analyzing the at least one user query to determine one or more indications of one or more of:
  - at least one intent classification associated with the at least one user query, at least one domain tag associated with the at least one user query, or at least one input slot associated with the at least one user query;
  - determining the one or more indications do not correspond to a specific dialog system; and
- based at least on the determining, transmitting the at least one user query to the at least one open domain dialog system as a default domain dialog system.

* * * * *